(12) United States Patent
Stokes

(10) Patent No.: US 10,435,960 B2
(45) Date of Patent: Oct. 8, 2019

(54) ALIGNMENT SUB WITH DEFORMABLE SLEEVE

(71) Applicant: Halliburton Energy Services, Inc., Houston, TX (US)

(72) Inventor: Matthew Bradley Stokes, Keller, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 110 days.

(21) Appl. No.: 15/560,746

(22) PCT Filed: Jul. 14, 2016

(86) PCT No.: PCT/US2016/042187
§ 371 (c)(1),
(2) Date: Sep. 22, 2017

(87) PCT Pub. No.: WO2018/013113
PCT Pub. Date: Jan. 18, 2018

(65) Prior Publication Data
US 2018/0252054 A1    Sep. 6, 2018

(51) Int. Cl.
*E21B 17/042*    (2006.01)
*E21B 17/07*    (2006.01)
(Continued)

(52) U.S. Cl.
CPC .......... *E21B 17/07* (2013.01); *E21B 17/042* (2013.01); *E21B 19/16* (2013.01); *F16L 15/04* (2013.01); *F16L 15/08* (2013.01)

(58) Field of Classification Search
CPC ...... E21B 17/042; E21B 17/07; E21B 17/073; E21B 19/16; E21B 19/166; E21B 41/00; F16L 15/04; F16L 15/08
See application file for complete search history.

(56) References Cited

U.S. PATENT DOCUMENTS 266,848 A * 10/1882 Lewis ................. E21B 33/1216
277/337
2,693,374 A   11/1954 Wurzburger
(Continued)

FOREIGN PATENT DOCUMENTS

EA            000689 B1    2/2000
GB         1174208 A  * 12/1969  ............ F16L 15/008
(Continued)

OTHER PUBLICATIONS

International Search Report and Written Opinion issued in related PCT Application No. PCT/US2016/042187 dated Apr. 14, 2017, 16 pages.

*Primary Examiner* — Daniel P Stephenson
(74) *Attorney, Agent, or Firm* — Scott Richardson; Baker Botts L.L.P.

(57) ABSTRACT

In accordance with presently disclosed embodiments, a system and method for rotationally orienting two wellbore tool components on a tool string relative to each other is provided. The system may include an alignment sub that is simple to operate and allows for quick adjustments to the relative orientations of downhole tool components. The disclosed alignment sub may include a first tubular component on one side and a second tubular component on the other side, and these tubular components are coupled together. The disclosed alignment sub utilizes an axially deformable and variable length sleeve attached to the first tubular component and adjacent to a tip of the second tubular component. The sleeve may provide an appropriate standoff distance between the opposing tubular components while enabling the components to be rotated relative to each other up to at least one full rotation about an axis of the alignment sub.

18 Claims, 3 Drawing Sheets

(51) Int. Cl.
*E21B 19/16* (2006.01)
*F16L 15/04* (2006.01)
*F16L 15/08* (2006.01)
*E21B 17/10* (2006.01)

(56) References Cited

U.S. PATENT DOCUMENTS

| | | | | |
|---|---|---|---|---|
| 2,990,225 | A | | 6/1961 | Bucken et al. |
| 3,361,453 | A | * | 1/1968 | Brown .................. E21B 17/046 285/321 |
| 3,405,959 | A | | 10/1968 | Walker |
| 3,876,235 | A | * | 4/1975 | Flint ....................... F16L 27/12 285/288.1 |
| 3,936,590 | A | | 2/1976 | Albano |
| 5,066,052 | A | | 11/1991 | Read |
| 5,476,271 | A | * | 12/1995 | Hatting .................... F16J 15/20 277/511 |
| 5,738,385 | A | | 4/1998 | Homann et al. |
| 7,090,258 | B2 | * | 8/2006 | Rusting .................. F16L 21/04 285/288.1 |
| 8,496,273 | B1 | * | 7/2013 | Carstensen ............. F16L 15/04 285/333 |
| 2001/0045302 | A1 | | 11/2001 | Mazorow |
| 2005/0040652 | A1 | * | 2/2005 | Legeai ................ F16L 19/0231 285/360 |
| 2005/0086807 | A1 | * | 4/2005 | Richard ................ E21B 43/088 29/896.61 |
| 2005/0253380 | A1 | | 11/2005 | Gibb et al. |
| 2009/0283256 | A1 | | 11/2009 | Langeslag |
| 2010/0187808 | A1 | | 7/2010 | Santi et al. |
| 2011/0062670 | A1 | * | 3/2011 | Allen .................. E21B 33/1208 277/336 |
| 2014/0209323 | A1 | | 7/2014 | Pisetskiy et al. |
| 2015/0209570 | A1 | * | 7/2015 | Lee ..................... A61M 5/1454 604/244 |
| 2015/0300760 | A1 | * | 10/2015 | Jorgensen ................ F28F 11/02 165/71 |
| 2016/0369582 | A1 | * | 12/2016 | Bar ........................ E21B 23/01 |
| 2018/0252054 | A1 | * | 9/2018 | Stokes .................... E21B 41/00 |

FOREIGN PATENT DOCUMENTS

| | | |
|---|---|---|
| RU | 2149253 C1 | 5/2000 |
| SU | 981567 A1 | 12/1982 |
| SU | 1247505 A1 | 7/1986 |
| WO | 1992/000484 A1 | 1/1992 |
| WO | 2013/103786 A2 | 7/2013 |
| WO | 2015/012847 A1 | 1/2015 |

* cited by examiner

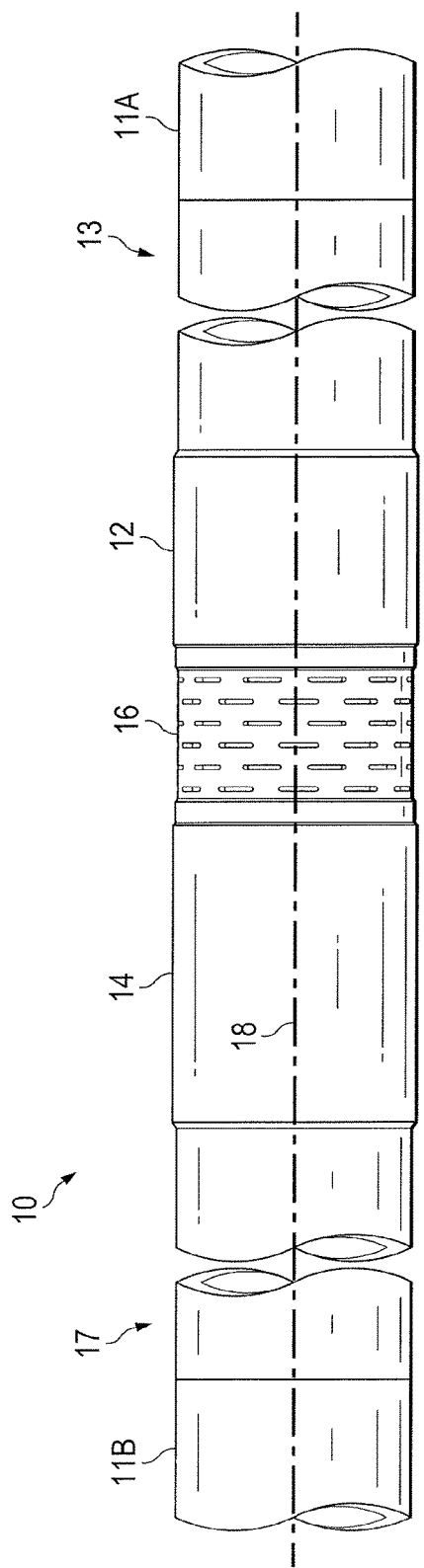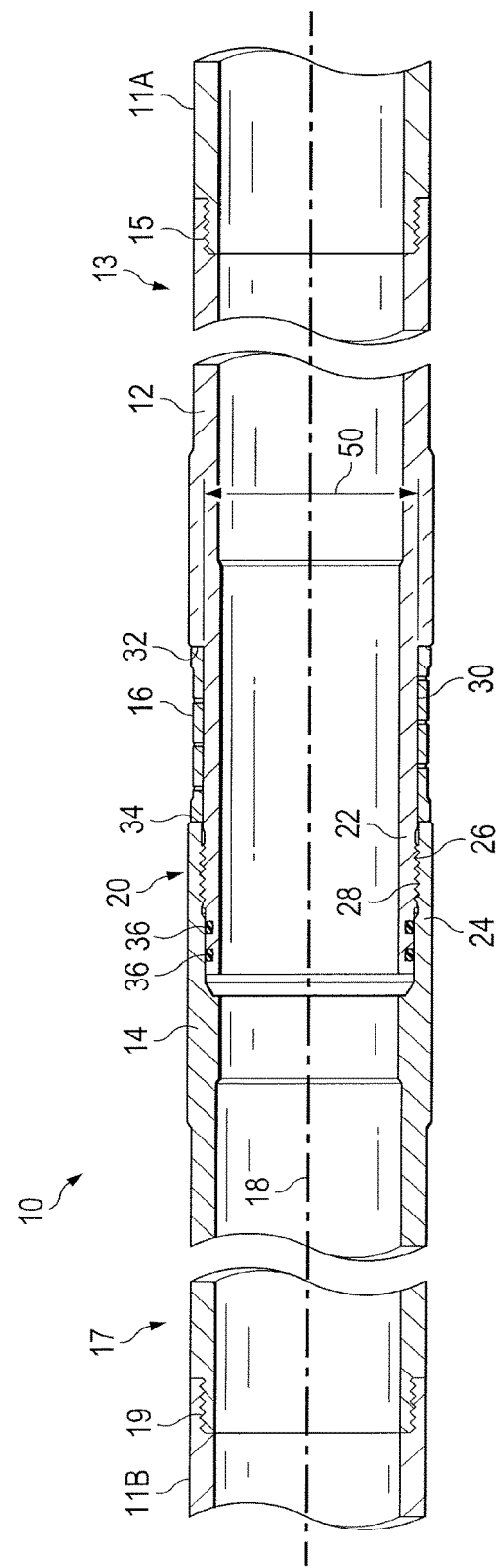

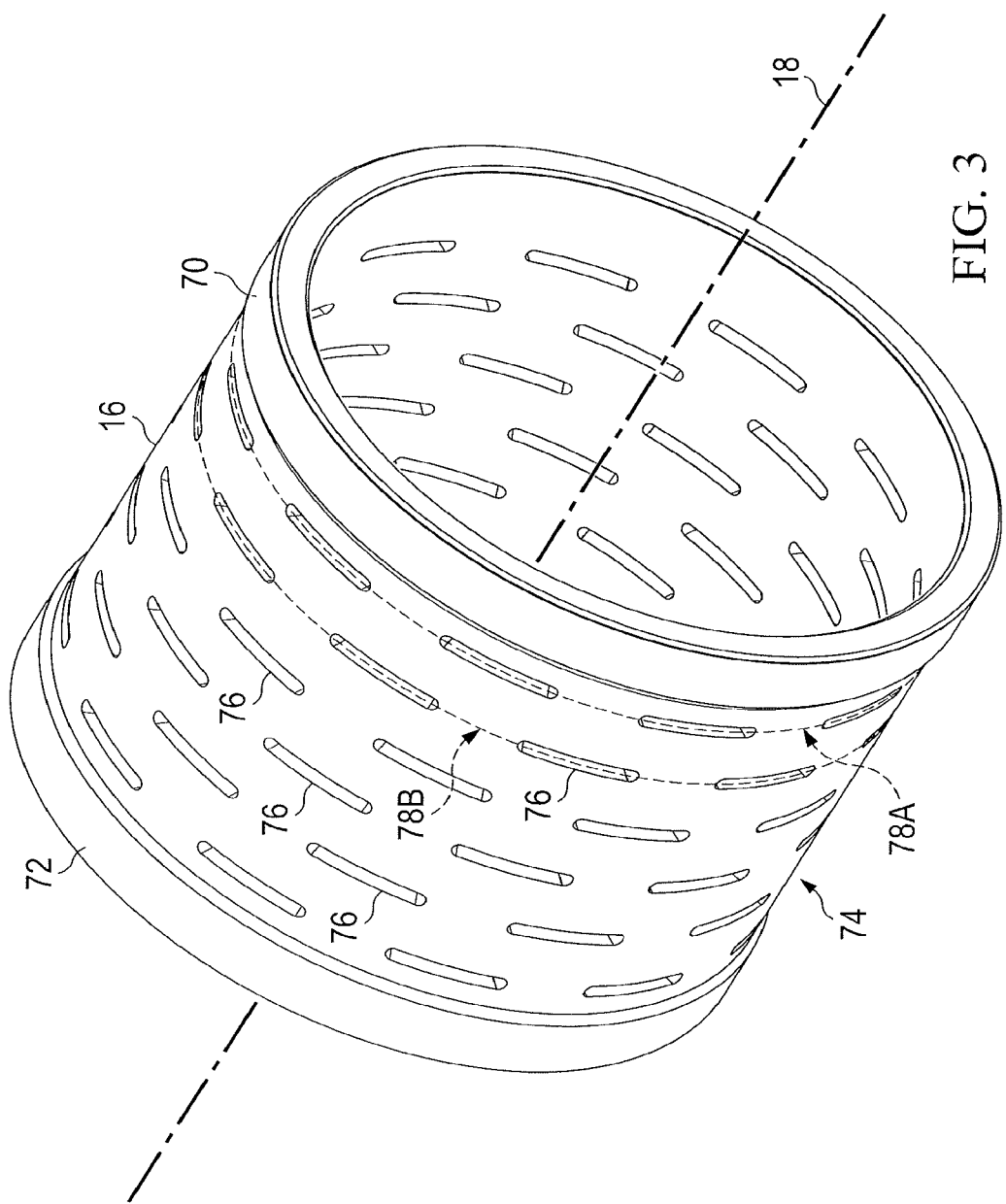

ALIGNMENT SUB WITH DEFORMABLE SLEEVE

CROSS-REFERENCE TO RELATED APPLICATION

The present application is a U.S. National Stage Application of International Application No. PCT/US2016/042187 filed Jul. 14, 2016, which is incorporated herein by reference in its entirety for all purposes.

TECHNICAL FIELD

The present disclosure relates generally to the alignment of wellbore tool components, and more particularly, to an alignment sub used to adjust a relative orientation of two wellbore tool components.

BACKGROUND

Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

After drilling a wellbore that intersects a subterranean hydrocarbon-bearing formation, a variety of wellbore tools may be positioned in the wellbore during completion, production, or remedial activities. It is sometimes beneficial to be able to rotationally or azimuthally orient a wellbore tool component on a tool string relative to another wellbore tool component on the tool string. For example, a first tool component on a tool string may be oriented in a certain direction relative to a second tool component on the tool string such that, when the first tool component is lowered into a wellbore and locked into place via a latch coupling, the second tool component is locked in a desired orientation.

Torque rings are sometimes used to align or orient two wellbore tool components on a tool string. The torque ring provides a standoff distance between two parts that are coupled together via a threaded connection. If the standoff distance is too great to allow the second tool component to be oriented appropriately, the connection is broken apart so that one side of the torque ring can be machined down by a desired amount. The connection is then remade between the wellbore tool components so that the second tool component is in a desired orientation relative to the first tool component.

BRIEF DESCRIPTION OF THE DRAWINGS

For a more complete understanding of the present disclosure and its features and advantages, reference is now made to the following description, taken in conjunction with the accompanying drawings, in which:

FIG. 1 is a side view of an alignment sub with a deformable sleeve, in accordance with an embodiment of the present disclosure;

FIG. 2 is a cutaway view of the alignment sub of FIG. 1, in accordance with an embodiment of the present disclosure;

FIG. 3 is a perspective view of the deformable sleeve of FIG. 1, in accordance with an embodiment of the present disclosure.

DETAILED DESCRIPTION

Figure 4:
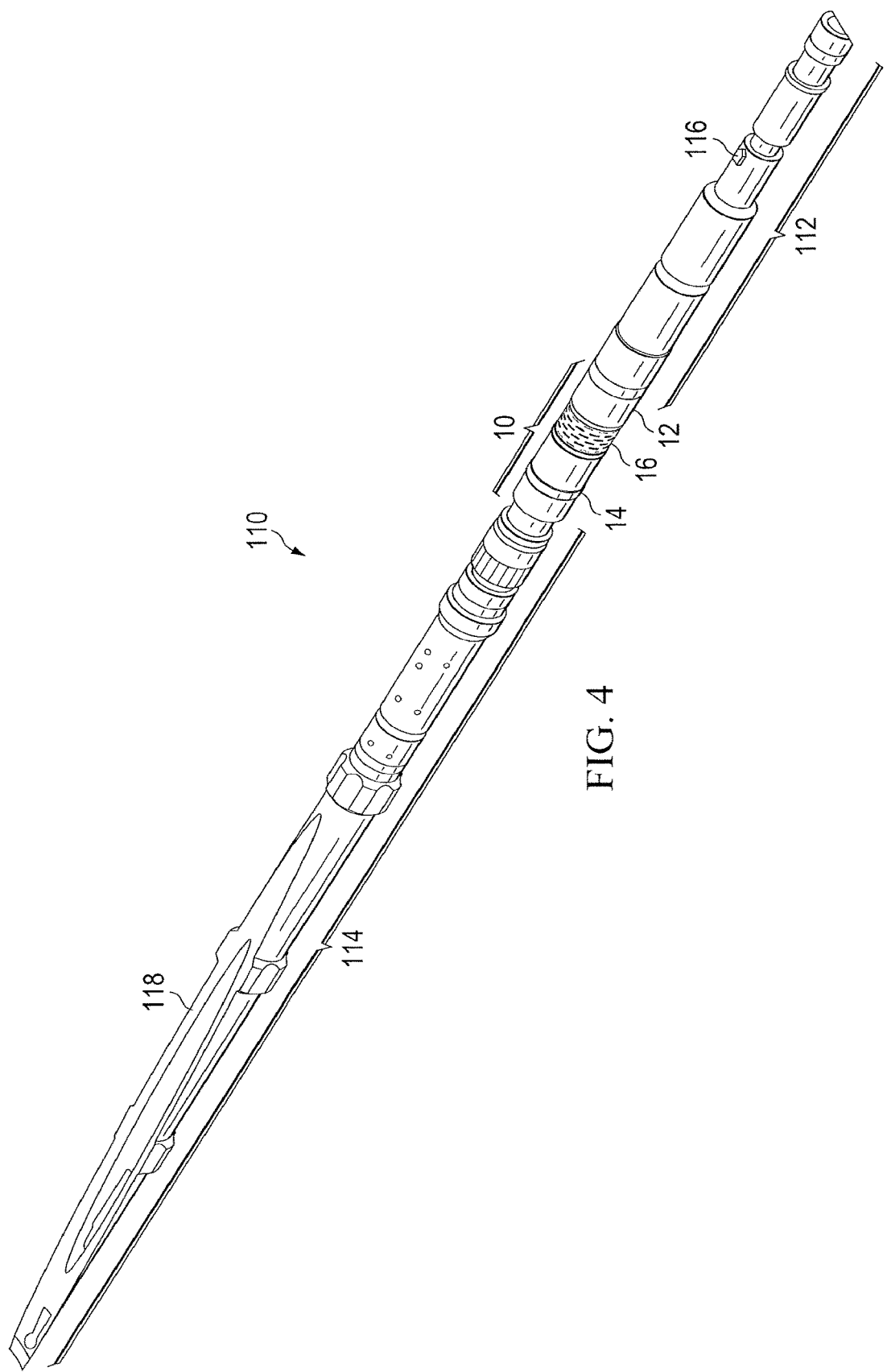
FIG. 4 is a perspective view of a tool string using the alignment sub of FIG. 1, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

As described in greater length below, systems and methods for rotationally orienting two wellbore tool components on a tool string relative to each other without breaking a connection between the tool components are provided. The systems may include a wellbore tool alignment sub that is simple to operate and allows for quick adjustments to the relative orientations of tool components. The alignment sub may be used to orient any desired types or arrangements of wellbore tool components disposed on a tool string to be positioned downhole. The term "wellbore tool components" disclosed herein may refer to two different parts of a single downhole tool, or may refer to two distinct downhole tools that are coupled together along a tool string.

The disclosed alignment sub may include a first tubular component on one side and a second tubular component on the other side, and these tubular components are coupled together. The alignment sub utilizes an axially deformable and variable length sleeve attached to an end portion of the first tubular component and adjacent a tip of an end portion of the second tubular component. The deformable sleeve may be constructed with a desired geometry and/or thickness to allow enough deformation to orient one end of the alignment sub azimuthally relative to the other end. The deformable sleeve may have a torsional stiffness that allows the deformable sleeve to provide an appropriate standoff distance between the opposing tubular components while enabling the components to be rotated relative to each other to at least one full (360 degree) rotation about an axis of the alignment sub.

The alignment sub may be connected (e.g., via threads) between two wellbore tool components on a tool string and used to adjust the relative orientation of these tool components. One deformable sleeve may be designed for each particular size of alignment sub, regardless of the types of threads used to connect the two tool components to the alignment sub. The alignment sub with the deformable sleeve may facilitate easy orientation of the tool components relative to each other, without having to break the connection between the tool components. This saves time and costs associated with tool string construction and installation.

Turning now to the drawings, FIGS. 1 and 2 illustrate an embodiment of the disclosed alignment sub 10, which may be used to couple two wellbore tool components 11A and 11B in a desired orientation relative to each other. As illustrated, the alignment sub 10 may include three main parts: a first tubular component 12; a second tubular component 14; and an axially deformable sleeve 16 disposed around the first tubular component 12 and held between the first and second tubular components 12 and 14.

The first tubular component 12 may be coupled at a distal end 13 to the first tool component 11A via threads 15, and the second tubular component 14 may be coupled at a distal end 17 to the second tool component 11B via threads 19. Thus, two tool components 11A and 11B may be connected together within a tool string using the alignment sub 10. The alignment sub 10 may enable rotation of the connected wellbore tool components 11A and 11B relative to each other up to at least one full rotation about a longitudinal axis 18 of the alignment sub 10, while maintaining the connection within a predetermined torque range via the sleeve 16. That way, the tool components 11A and 11B may be positioned in any desired orientation about the longitudinal axis 18 relative to each other without having to break apart the connection.

As shown in FIG. 2, the tubular components 12 and 14 of the alignment sub 10 are connected together when the alignment sub 10 is fully assembled. These tubular components 12 and 14 may be connected together via an internal threaded connection 20. The first tubular component 12 may include an end portion 22 (e.g., pin) that is received into an end portion 24 (e.g., box) of the second tubular component 14. The end portion 22 is located at an opposite end of the first tubular component 12 from the distal end 13 connected to the tool component 11A. Similarly, the end portion 24 is located at an opposite end of the second tubular component 14 from the distal end 17 connected to the tool component 11B. An external surface 26 of the end portion 22 features a set of threads, while an internal surface 28 of the end portion 24 features a complementary set of threads. These threads are mated to form the internal threaded connection 20 between the first and second tubular components 12 and 14 of the alignment sub 10.

As illustrated, the deformable sleeve 16 may be disposed around and attached to the end portion 22 at a location indicated by the element number 30. The deformable sleeve 16 may be disposed around and attached to the end portion 22 at an axial location (taken along axis 18) that is adjacent a tip 34 of the end portion 24 of the second tubular component 14. That way, the deformable sleeve 16 is attached to the end portion 22 of the first tubular component 12 without being surrounded by the end portion 24 of the second tubular component 14.

The deformable sleeve 16 may disposed between and engaged by opposing abutment surfaces (32 and 34) of the first and second tubular components 12 and 14. For example, the deformable sleeve 16 may be positioned between and engaged by an external shoulder 32 formed on end portion 22 of the first tubular component 12 and the tip 34 of the end portion 24 of the second tubular component 14. Thus, the deformable sleeve 16 extends longitudinally between the opposing abutment surfaces of the first and second tubular components 12 and 14. As the first and second tubular components 12 and 14 are rotated into connection with each other, the shoulder 32 of the end portion 22 and the tip 34 of the end portion 24 exert a compressive force on the deformable sleeve 16 in a direction of the longitudinal axis 18.

As illustrated, the threaded connection 20 of the alignment sub 10 may be fluidically sealed by one or more O-rings 36 or similar seals disposed between the end portion 22 of the first tubular component 12 and the end portion 24 of the second tubular component 14. The seals 36 may be disposed between the first and second tubular components 12 and 14 on one side of the threaded connection 20, and the deformable sleeve 16 may be attached to the first tubular component 12 on an opposite side (in the direction of axis 18) of the threaded connection 20.

The alignment sub 10 relies on the deformable sleeve 16 to adjust an orientation of the first tubular component 12 (and connected tool component 11A) relative to the second tubular component 14 (and connected tool component 11B). The deformable sleeve 16, tubular components 12 and 14, and threaded connection 20 may be sized such that the sleeve 16 will be compressed and begin to axially deform (i.e., varying the length of the sleeve 16) near a predetermined torque to be applied via the threaded connection 20. The deformable sleeve 16 may be designed to deform and vary its length enough to allow for at least one complete rotation between the mating components 12 and 14 as the threaded connection 20 is made up within a desired torque range. That way, the deformable sleeve 16 may facilitate proper orientation of the connected wellbore tool components 11A and 11B while also maintaining a desired torque applied to the threaded connection 20. The illustrated deformable sleeve 16 is merely one representation of such a sleeve that may be utilized to adjust the relative orientation of the first and second tubular components 12 and 14 of the alignment sub 10, and other arrangements or designs may be used as well.

The deformable sleeve 16 may be designed so that at least one full turn on a tightly pitched thread of the threaded connection 20 can be made while maintaining a torque on the connection 20 between a minimum and maximum allowable torque. The sleeve 16 may be designed by manipulating its thickness and/or overall geometry to allow for the desired axially deformation needed to facilitate the relative orientation of the first tubular component to the second tubular component 12. The threaded connection 20 of the alignment sub 10 may simply be torqued up (via rotation between the first and second tubular components 12 and 14) until one end of the alignment sub 10 is in a desired rotational orientation relative to the other end. The deformable sleeve 16 may function similar to a spring disposed between the first and second tubular components 12 and 14 during this rotation.

Since the deformable sleeve 16 allows for orientation of the first and second tubular components 12 and 14 while maintaining a desired torque on the connection 20, the alignment sub 10 does not require any disassembly in order to properly align the connected tool components 11A and 11B. This is different from systems that utilize torque rings to provide a desired standoff between two components that are connected within a desired torque range. In systems using a torque ring, the torque ring is disposed within the threaded connection, an orientation adjustment is determined once the connection is made, and the connection is then broken apart so that the torque ring can be resized to provide a desired orientation adjustment. Using the disclosed alignment sub 10, however, the connection 20 does not have to be broken apart to adjust the relative orientations of the wellbore tool components 11A and 11B. The sleeve 16 axially deforms to adjust the length of the sleeve 16 (and therefore the standoff distance) as the first and second tubular components 12 and 14 are rotated relative to each other to adjust their orientation.

As mentioned above, the opposing ends of the alignment sub 10 may be coupled respectively to two tool components 11A and 11B that are to be placed in a desired rotational orientation relative to each other. The first tubular component 12 may include threads 15 at the distal end 13 for connecting the first tool component 11A to the alignment sub 10, and the second tubular component 14 may include threads 19 at the distal end 17 for connecting the second tool component 11B to the alignment sub 10.

A single deformable sleeve 16 may be designed for each particular size (i.e., diameter 50) and type of connection 20 of the alignment sub 10, regardless of the size, type, or shape of threads 15 and 19 used to couple the ends 13 and 17 of the alignment sub 10 to the tool components 11A and 11B. For example, the deformable sleeves 16 used on alignment subs 10 having different diameters 50 (e.g., 9⅝", 10¾", and 7") may be designed with different geometries. However, deformable sleeves 16 having the same geometry may be used on alignment subs 10 having the same diameter 50 and the same high-pitched internal threads (for the threaded connection 20), regardless of the size or type of threads 15 and 19 used to couple the alignment sub 10 between the wellbore tool components 11A and 11B. That way, a limited number of geometries of the deformable sleeve 16 may be designed and tested for use with alignment subs 10 to connect a variety of different wellbore tool components 11. This may reduce the manufacturing costs associated with the alignment sub 10, since only two or three different sizes of deformable sleeves 16 may be produced.

The disclosed deformable sleeve 16 may be designed in such a way that all the axial deformation occurring within the available torque range is elastic deformation. This may enable the deformable sleeve 16 to be reused to align another pair of tool components 11A and 11B at a later time. After the sleeve 16 is elastically deformed and used to apply the desired torque while enabling proper orientation of two tool components 11A and 11B, the tool string may be used in the wellbore. The tool string may then be pulled from the wellbore, the alignment sub 10 uncoupled from the first and second tool components 11A and 11B, and the alignment sub 10 with the sleeve 16 later reused on another tool string.

The deformable sleeve 16 may be designed such that at least a portion of the deformation during the rotational range is plastic deformation. In such instances, the deformable sleeve 16 would be expendable and not reused in later applications. The deformable sleeve 16 may therefore be included in a re-dress kit for the alignment sub 10. That way, after the sleeve 16 is plastically deformed and used to apply the desired torque force while enabling proper orientation of two tool components 11A and 11B, the tool string may be used and then removed from the wellbore, the alignment sub 10 broken apart, and the sleeve 16 removed from the end portion 22 of the alignment sub 10 and discarded. The alignment sub 10 may then be reused with a different deformable sleeve 16.

The alignment sub 10 may be used to connect wellbore tool components 11 that are part of a service tool string. A service tool string may be a string of wellbore service equipment that is lowered through the wellbore, used to perform one or more operations downhole, and retrieved to the surface for later use. When the alignment sub 10 is used in such a service tool string, the deformable sleeve 16 may be either reused (if the deformation is elastic) or may be discarded from the alignment sub 10 and replaced before another wellbore servicing operation is performed using the service tool. When the deformable sleeve 16 is replaced, the O-rings 36 or other seals may be replaced on the alignment sub 10 as well.

The alignment sub 10 may be used to connect wellbore tool components 11 that are part of a well completion designed to remain downhole permanently or for a long period of time. For example, the alignment sub 10 may be used to connect lengths of casing or other permanent installations that need to be properly aligned. In such instances, the alignment sub 10 may not be reusable.

FIG. 3 is a more detailed view of the deformable sleeve 16 that may be used in the disclosed alignment sub. As illustrated, the sleeve 16 may be cylindrical in shape, with an inner radius sized for the sleeve 16 to be received over the end portion (e.g., 22 of FIG. 2) of a corresponding alignment sub (e.g., 10 of FIG. 2). The sleeve 16 may include a first end 70 on one side for engaging with the shoulder (e.g., 32 of FIG. 2) on the first tubular component of the alignment sub, and a second end 72 opposite the first end 70 for engaging with the tip (e.g., 34 of FIG. 2) of the second tubular component (e.g., 14 of FIG. 2) of the alignment sub. The sleeve 16 also includes a central deformable section 74 with several slots 76 formed therein to enable axially deformation of the sleeve 16 in response to rotation of the first and second tubular components relative to each other. The central deformable section 74 extends longitudinally between the two ends 70 and 72. The two ends 70 and 72 may have a larger thickness than the central deformable section 74 of the sleeve 16. The thickness of the deformable sleeve 16 may be less than the thickness of each of the first and second tubular components (e.g., 12 and 14 of FIG. 2). The sleeve 16 may be symmetric between the two ends 70 and 72 such that the sleeve 16 can be disposed around and attached to the first tubular component in either direction to provide the same deformation.

The slots 76 formed through the central section 74 may each be elongated in shape and circumferentially disposed around the sleeve 16. The slots 76 may be arranged in multiple circumferential rows 78. The slots 76 in each row 78 may be equally spaced from each other, and the slots 76 in each row (e.g., 78A) may be positioned out of phase with the slots 76 in an adjacent row (e.g., 78B). That is, the slots 76 in one row 78A may each be disposed at a circumferential position corresponding to a space between two slots 76 in the adjacent row 78B.

The slots 76 may be cutouts that extend all the way through the thickness of the central section 74. The material of the central section 74 left between the slots 76 generally acts as a compliant hinge allowing for the desired axially deformation of the sleeve 16 in response to an applied torque. The material properties and the geometry of the slotted central portion 74 may determine the force required to compress the deformable sleeve 16. The sleeve 16 may be designed to provide enough of a spring force between the first and second tubular components of the alignment sub to maintain sufficient torque values on the connection. Anticipated downhole temperatures may be accounted for in the design of the deformable sleeve 16 as well, since the spring force resulting from elastic deformation may decrease as downhole temperature increases.

The sleeve 16 may be constructed from the same material as both constituent parts of the alignment sub connection (i.e., the first and second tubular components 12 and 14 of FIGS. 1 and 2). However, any material may be used to form the deformable sleeve 16 (e.g., steel, aluminum, plastic, etc.). The material selection for the deformable sleeve 16 may be based on certain requirements for the alignment sub connection.

The specific thickness and overall geometry of the deformable sleeve 16 may have a greater impact than the sleeve material on the torque force and compression available using the sleeve 16. The geometry of the central section 74 of the sleeve 16 is designed to function as something between a spring and a piece of solid tubing. The size of the slots 76 (e.g., width and length) may be varied to change the spring force and compression available through the deformable sleeve 16. In addition, the number, pattern, shapes, and arrangement of slots 76 on the central deformable portion 74 may be adjusted to provide the desired deformation. Further, the thickness of the central section 74 may be varied to adjust the deformation available through the sleeve 16. A sleeve 16 having a larger number of slots 76 or a decreased thickness may facilitate a larger deformation of the central portion 74 of the sleeve 16 as additional torque is applied to the alignment sub connection.

FIG. 4 illustrates an example wellbore tool string 110 that may utilize the disclosed alignment sub 10 to align two wellbore tool components 112 and 114 on the tool string 110. In the illustrated embodiment, the tool string 110 may be a whipstock assembly. However, other types of tool strings 110 may make use of the alignment sub 10 in a similar manner. The first tool component 112 of the tool string 110 may include an orienting lug 116 that is keyed to fit into a latch coupling that is fixed inside a casing within a wellbore. That way, the tool string 110 can be lowered to a desired depth through the casing in the wellbore and then rotated until the orienting lug 116 engages with the latch coupling on the casing. This secures the tool string 110 into a desired position within the wellbore.

The second tool component 114 of the tool string 110 may include a whipstock face 118 designed to provide an inclined surface for directing a downhole tool in a deviated direction away from the wellbore casing. It may be desirable for the whipstock face 118 to be aligned with the orienting lug 116, as shown. That way, when the tool string 110 is locked into position downhole via the orienting lug 116, the whipstock face 118 is automatically secured facing a desired direction.

The alignment sub 10 may be used to adjust the relative orientation between the first and second tool components 112 and 114 prior to positioning the tool string 110 downhole. Specifically, the alignment sub 10 may be used to orient the tool components 112 and 114 to bring the whipstock face 118 into alignment with the orienting lug 116. The second tool component 114 may be rotated with respect to the first tool component 112 such that the second tubular component 14 of the alignment sub 10 rotates relative to the first component 12 of the alignment sub 10. In response to this rotation, the sleeve 16 deforms axially, facilitating an orientation adjustment between the first and second tubular components 12 and 14 (and consequently the wellbore tool components 112 and 114) while maintaining an appropriate torque on the alignment sub internal threaded connection.

Embodiments disclosed herein include:

A. An alignment sub including a first tubular component having an end portion and a second tubular component having an end portion, which is connected to the end portion of the first tubular component. The alignment sub also includes an axially deformable and variable length sleeve disposed around and attached to the end portion of the first tubular component and adjacent to a tip of the end portion of the second tubular component.

B. An apparatus including an axially deformable and variable length sleeve sized to be disposed around an end portion of a first tubular component. The sleeve includes a first end for engaging the first tubular component and a second end opposite the first end for engaging a tip of an end portion of a second tubular component coupled to the first tubular component. The sleeve also includes a central deformable section extending between the first and second ends, wherein the central deformable section includes slots formed therein.

C. A method including connecting an end portion of a first tubular component to an end portion of a second tubular component. The method also includes rotating the second tubular component relative to the first tubular component to rotationally align the first and second tubular components. The method further includes axially deforming a variable length sleeve disposed around and attached to the end portion of the first tubular component and adjacent to a tip of the end portion of the second tubular component in response to the rotation so as to maintain the connection between the first and second tubular components within a predetermined torque range while rotationally aligning the first and second tubular components.

Each of the embodiments A, B, and C may have one or more of the following additional elements in combination: Element 1: wherein the sleeve includes a plurality of slots formed therethrough. Element 2: wherein each of the plurality of slots is elongated in shape and circumferentially disposed around the sleeve in one of a plurality of rows of slots, wherein the slots in each of the plurality of rows are equally spaced from each other, and wherein the slots in each of the plurality of rows are positioned out of phase with the slots in an adjacent row. Element 3: wherein the sleeve includes a torsional stiffness that allows the sleeve to deform axially between the first and second tubular components in response to up to one full rotation of the first and second tubular components relative to each other. Element 4: wherein the first tubular component includes a distal end portion opposite the end portion for connecting the alignment sub to a first wellbore tool component on a tool string, and wherein the second tubular component includes a distal end portion opposite the end portion for connecting the alignment sub to a second wellbore tool component on the tool string. Element 5: further including an O-ring disposed between the end portion of the first tubular component and the end portion of the second tubular component. Element 6: wherein the sleeve is removable from the end portion of the first tubular component. Element 7: wherein the end portion of the second tubular component is connected to the end portion of the first tubular component via a threaded connection. Element 8: wherein the sleeve is constructed from the same material as the first and second tubular components. Element 9: wherein a thickness of the sleeve is less than a thickness of each of the first and second tubular components.

Element 10: wherein each of the plurality of slots is elongated in shape and circumferentially disposed around the sleeve in one of a plurality of rows of slots, wherein the slots in each of the plurality of rows are equally spaced from each other, and wherein the slots in each of the plurality of rows are positioned out of phase with the slots in an adjacent row. Element 11: wherein the slots extend through the entire thickness of the sleeve. Element 12: wherein the first end and the second end both have a larger thickness than the central deformable section.

Element 13: further including: connecting the end portion of the first tubular component to the end portion of the second tubular component via a threaded connection; and maintaining the threaded connection within a predetermined torque range via the sleeve while rotating the second tubular component relative to the first tubular component. Element 14: further including: coupling a first wellbore tool component to the first tubular component; coupling a second wellbore tool component to the second tubular component; and rotationally aligning the first and second wellbore tool components via rotation of the second tubular component relative to the first tubular component. Element 15: further including uncoupling the first and second wellbore tool components from the first and second tubular components, respectively, and reusing the first and second tubular components with the sleeve. Element 16: wherein deforming the sleeve includes plastically deforming the sleeve. Element 17: further including uncoupling the first tubular component from the second tubular component, removing the sleeve from the end portion of the first tubular component, and reusing the first and second tubular components with a different axially deformable and variable length sleeve.

Although the present disclosure and its advantages have been described in detail, it should be understood that various changes, substitutions and alterations can be made herein without departing from the spirit and scope of the disclosure as defined by the following claims.

What is claimed is:

1. An alignment sub, comprising:
    a first tubular component having an end portion;
    a second tubular component having an end portion, which is directly connected to the end portion of the first tubular component via a threaded connection; and
    an axially deformable and variable length sleeve disposed around and attached to the end portion of the first tubular component and adjacent to a tip of the end portion of the second tubular component.

2. The alignment sub of claim 1, wherein the sleeve comprises a plurality of slots formed therethrough.

3. The alignment sub of claim 2, wherein each of the plurality of slots is elongated in shape and circumferentially disposed around the sleeve in one of a plurality of rows of slots, wherein the slots in each of the plurality of rows are equally spaced from each other, and wherein the slots in each of the plurality of rows are positioned out of phase with the slots in an adjacent row.

4. The alignment sub of claim 1, wherein the sleeve comprises a torsional stiffness that allows the sleeve to deform axially between the first and second tubular components in response to up to one full rotation of the first and second tubular components relative to each other.

5. The alignment sub of claim 1, wherein the first tubular component comprises a distal end portion opposite the end portion for connecting the alignment sub to a first wellbore tool component on a tool string, and wherein the second tubular component comprises a distal end portion opposite the end portion for connecting the alignment sub to a second wellbore tool component on the tool string.

6. The alignment sub of claim 1, further comprising an O-ring disposed between the end portion of the first tubular component and the end portion of the second tubular component.

7. The alignment sub of claim 1, wherein the sleeve is removable from the end portion of the first tubular component.

8. The alignment sub of claim 1, wherein the sleeve is constructed from the same material as the first and second tubular components.

9. The alignment sub of claim 1, wherein a thickness of the sleeve is less than a thickness of each of the first and second tubular components.

10. An apparatus, comprising:
    an axially deformable and variable length sleeve sized to be disposed around an end portion of a first tubular component, wherein the sleeve comprises:
    a first end for engaging the first tubular component;
    a second end opposite the first end for engaging a tip of an end portion of a second tubular component coupled to the first tubular component; and
    a central deformable section extending between the first and second ends, wherein the central deformable section comprises slots formed therein;
    wherein the first end and the second end both have a larger thickness than the central deformable section.

11. The apparatus of claim 10, wherein each of the plurality of slots is elongated in shape and circumferentially disposed around the sleeve in one of a plurality of rows of slots, wherein the slots in each of the plurality of rows are equally spaced from each other, and wherein the slots in each of the plurality of rows are positioned out of phase with the slots in an adjacent row.

12. The apparatus of claim 10, wherein the slots extend through the entire thickness of the sleeve.

13. A method, comprising:
    connecting an end portion of a first tubular component to an end portion of a second tubular component;
    rotating the second tubular component relative to the first tubular component to rotationally align the first and second tubular components; and
    axially deforming a variable length sleeve disposed around and attached to the end portion of the first tubular component and adjacent to a tip of the end portion of the second tubular component in response to the rotation so as to maintain the connection between the first and second tubular components within a predetermined torque range while rotationally aligning the first and second tubular components.

14. The method of claim 13, further comprising:
    connecting the end portion of the first tubular component to the end portion of the second tubular component via a threaded connection; and
    maintaining the threaded connection within a predetermined torque range via the sleeve while rotating the second tubular component relative to the first tubular component.

15. The method of claim 13, further comprising:
    coupling a first wellbore tool component to the first tubular component;
    coupling a second wellbore tool component to the second tubular component; and
    rotationally aligning the first and second wellbore tool components via rotation of the second tubular component relative to the first tubular component.

16. The method of claim 15, further comprising uncoupling the first and second wellbore tool components from the first and second tubular components, respectively, and reusing the first and second tubular components with the sleeve.

17. The method of claim 13, wherein deforming the sleeve comprises plastically deforming the sleeve.

18. The method of claim 17, further comprising uncoupling the first tubular component from the second tubular component, removing the sleeve from the end portion of the first tubular component, and reusing the first and second tubular components with a different axially deformable and variable length sleeve.

* * * * *